United States Patent [19]

Bond et al.

[11] 3,836,969

[45] Sept. 17, 1974

[54] GEO-SYNCHRONOUS SATELLITES IN QUASI-EQUATORIAL ORBITS

[75] Inventors: Dold Spencer Bond, Princeton; John Michael Leigh Holman, Cranbury, both of N.J.

[73] Assignee: RCA Corporation, New York, N.Y.

[22] Filed: Oct. 26, 1971

[21] Appl. No.: 192,083

[52] U.S. Cl. .................. 343/100 ST, 325/4, 325/5, 325/65, 343/117 R

[51] Int. Cl. ............................................ H04b 7/20

[58] Field of Search .......... 343/100 ST, 117 R, 5 R, 343/100 SA; 325/5, 4, 65; 244/1 SA, 1 SS

[56] References Cited

UNITED STATES PATENTS 3,706,037 12/1972 Lundgren, Jr. ...................... 325/65

OTHER PUBLICATIONS

Ludgren, "A Satellite System for Avoiding Serial Sun-Transit Outages and Eclipses," October 70, The Bell System Technical Journal, pages 1943–1972.

Rowe and Penzias "Efficient Spacing of Synchronous Communication Satellites," Dec. 1968, The Bell System Technical Journal, Pages 2379–2433.

*Primary Examiner*—Maynard R. Wilbur
*Assistant Examiner*—G. E. Montone
*Attorney, Agent, or Firm*—Edward J. Norton; Joseph D. Lazar

[57] ABSTRACT

The method of the selection of launch conditions for a satellite at substantially synchronous altitude above the earth in a slightly inclined orbit relative to the equatorial plane of the earth to limit the inclination that may be induced by perturbations for significantly long periods of time without the need of orbit adjusting means (north-south station keeping means) aboard the satellite. One or more such satellites are arranged in a communication system in cooperation with at least one ground station. In a two-satellite system a communication channel is continuously operated between at least one satellite and the ground station notwithstanding solar outages.

18 Claims, 12 Drawing Figures

GEO-SYNCHRONOUS SATELLITES IN QUASI-EQUATORIAL ORBITS

BACKGROUND OF THE INVENTION

1. Field of the Invention

This invention relates to earth satellites. More particularly, it relates to the establishment of preferred orbits for geo-synchronous satellites for communication relay purposes.

2. Description of the Prior Art

Earth satellites now in use for the relaying of telecommunications between widely separated earth stations are placed in circular equatorial orbits at an altitude such that the period of revoltuion is equal to the period of rotation of the earth. Thus in principle the satellite remains at a fixed point in the sky as seen by an observer on the surface of the earth. It is thus approximately geo-stationary. It may also be said to be in a synchronous equatorial orbit.

In practice, the satellite, or spacecraft, is launched into a highly elliptical inclined orbit with apogee distance equal to the 22,300-mile altitude of the desired final synchronous orbit. Then a large rocket or "apogee-kick motor" and a series of vernier rockets, or thrusters, inject the spacecraft into the desired circular equatorial orbit at the selected longitude. The thrusters are operated from time to time by earth command to correct for gradual, secular, changes in the orbit elements. This correction by the thrusters is referred to as "station keeping."

Secular changes, as known in the art, are gradual changes in an orbit due to external forces or perturbations other than those affecting the regular orbit. The slow drift of the satellite along its orbit (east-west drift) can be due to inaccuracies in establishing the radius of the orbit or to other causes and can be corrected by relatively small expenditures of propellant fuel by the thruster during an extended lifetime.

Displacements of the satellite from the equatorial plane in the north-south direction (latitude changes) occur if the satellite orbit is inclined to the equatorial plane. The inclination of the orbit changes with time due to fundamental reasons of celestial mechanics, and the inclination is maintained near zero by a much greater expenditure of propellant fuel than is required for east-west station keeping. For a satellite lifetime of a number of years, the mass of the propellant for north-south station keeping can become a very substantial fraction of the total mass of the spacecraft in orbit.

Earth stations cooperating with such a satellite employ large antenna dishes with narrow pencil beams, generally of the order of a few tenths of a degree or even less. Such antennas are provided with tracking means for pointing the antenna at the satellite and for following its small periodic or secular drifts.

SUMMARY OF THE INVENTION

According to the present invention one or more satellites are injected into a substantially geo-synchronous orbit, each orbit at a selected inclination relative to the equatorial plane of the earth and each of the satellite orbits being progressively inclined as related to any of the other orbits. The inclinations and orientation of each orbit are such that its inclination remains bounded by the initial value during the lifetime of the satellite so that the need of on-board north-south station keeping means is obviated.

According to a feature of the invention, a satellite communication system consisting of one or more such satellites and a ground station cooperate to provide a communication channel between the ground and at least one of the satellites at all times notwithstanding solar outages. The system includes switching means for transferring communication channels from one satellite to another at selected times of the year.

Figure 3:
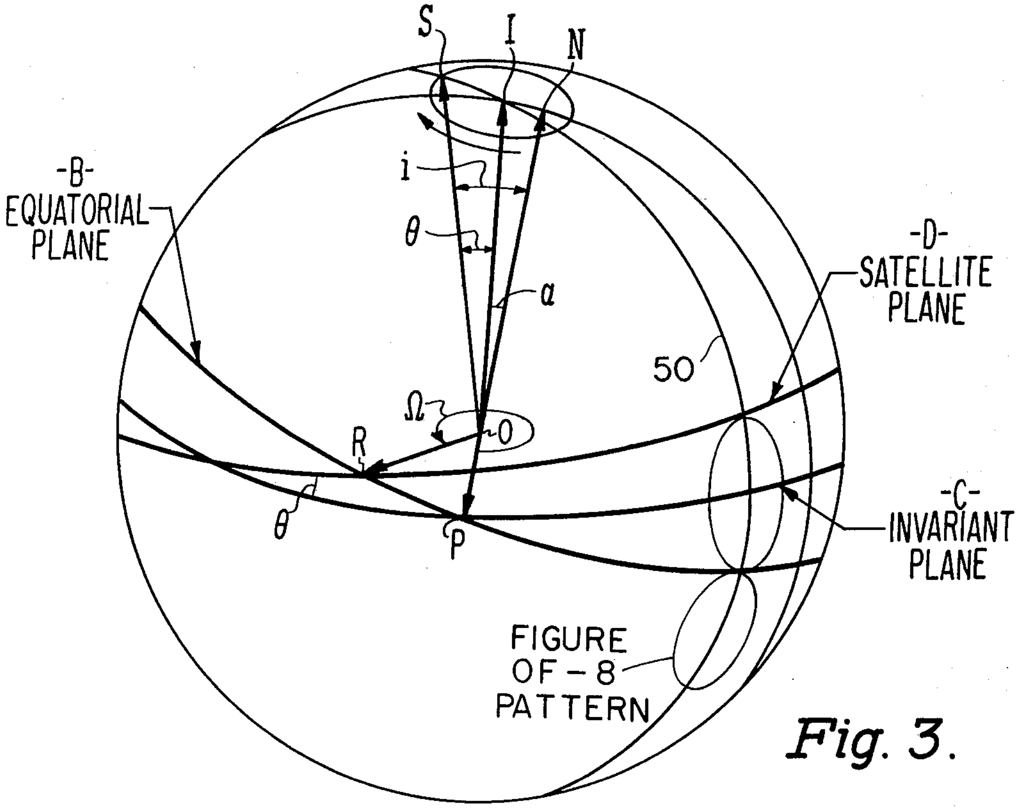
FIG. 3 is a diagram illustrating the precession of the satellite orbit normal.

FIG. **4*a* is a diagram in gnomonic projection of FIG. 3** indicating the relationship of the locus of the satellite orbit normal to the inclination and right ascension coordinates.

Figure 4A:
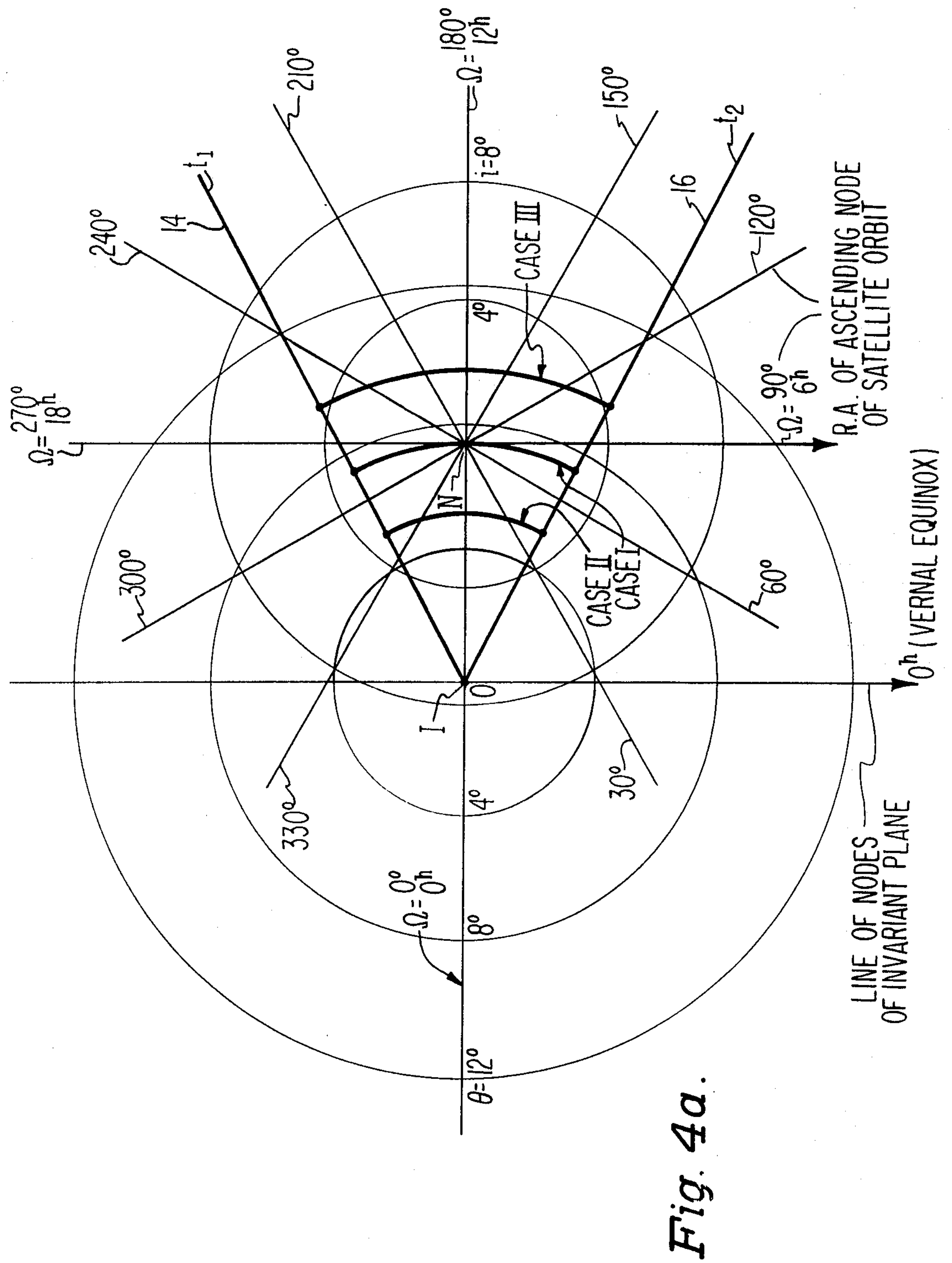

FIG. **4*b* is an enlarged view of a portion of FIG. 4*a***.

FIGS. **5*a* and 5*b*** are illustrations respectively of the locus of the orbit normal for two initial conditions.

FIGS. **6*a* and 6*b*** are graphs illustrating the inclination and right ascension during the lifetime of three satellites.

Figure 7:
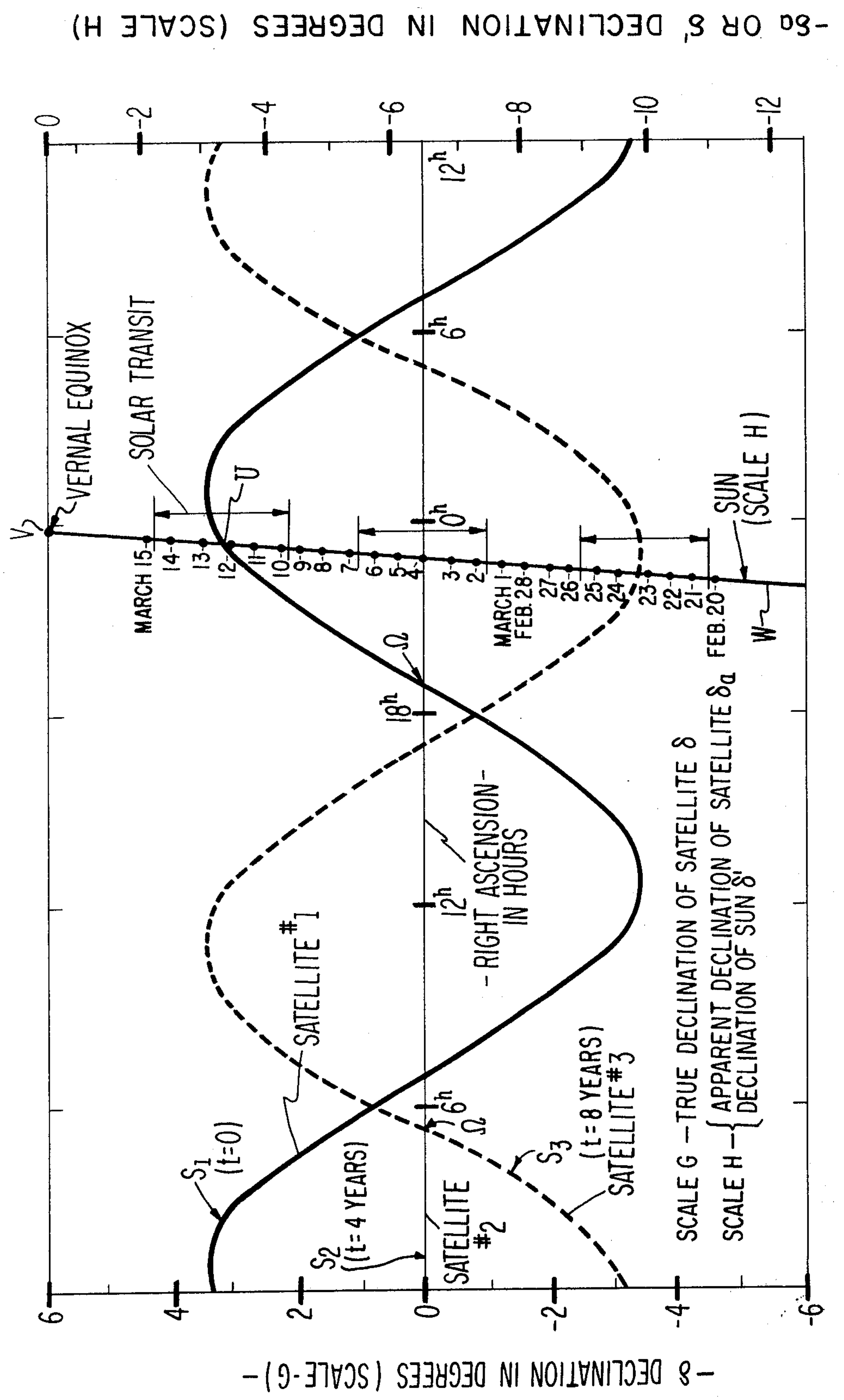

FIG. 7 is a graph to illustrate the conditions for which sun transit outages occur.

Figure 8:
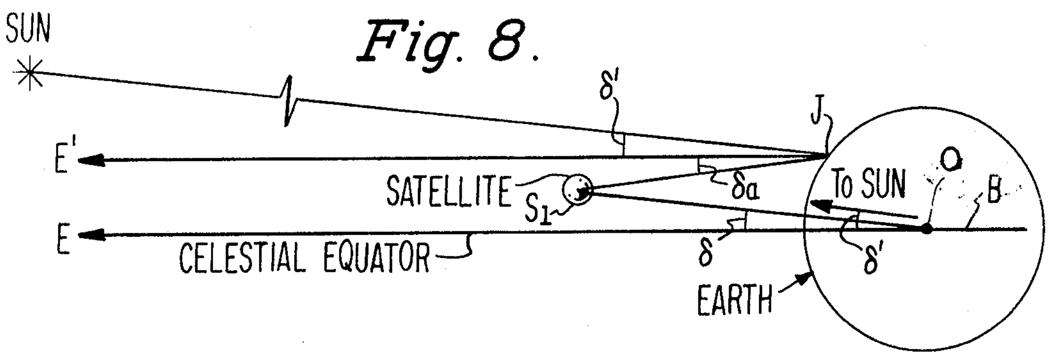

FIG. 8 is a diagram illustrating the effect of satellite parallax.

Figure 9:
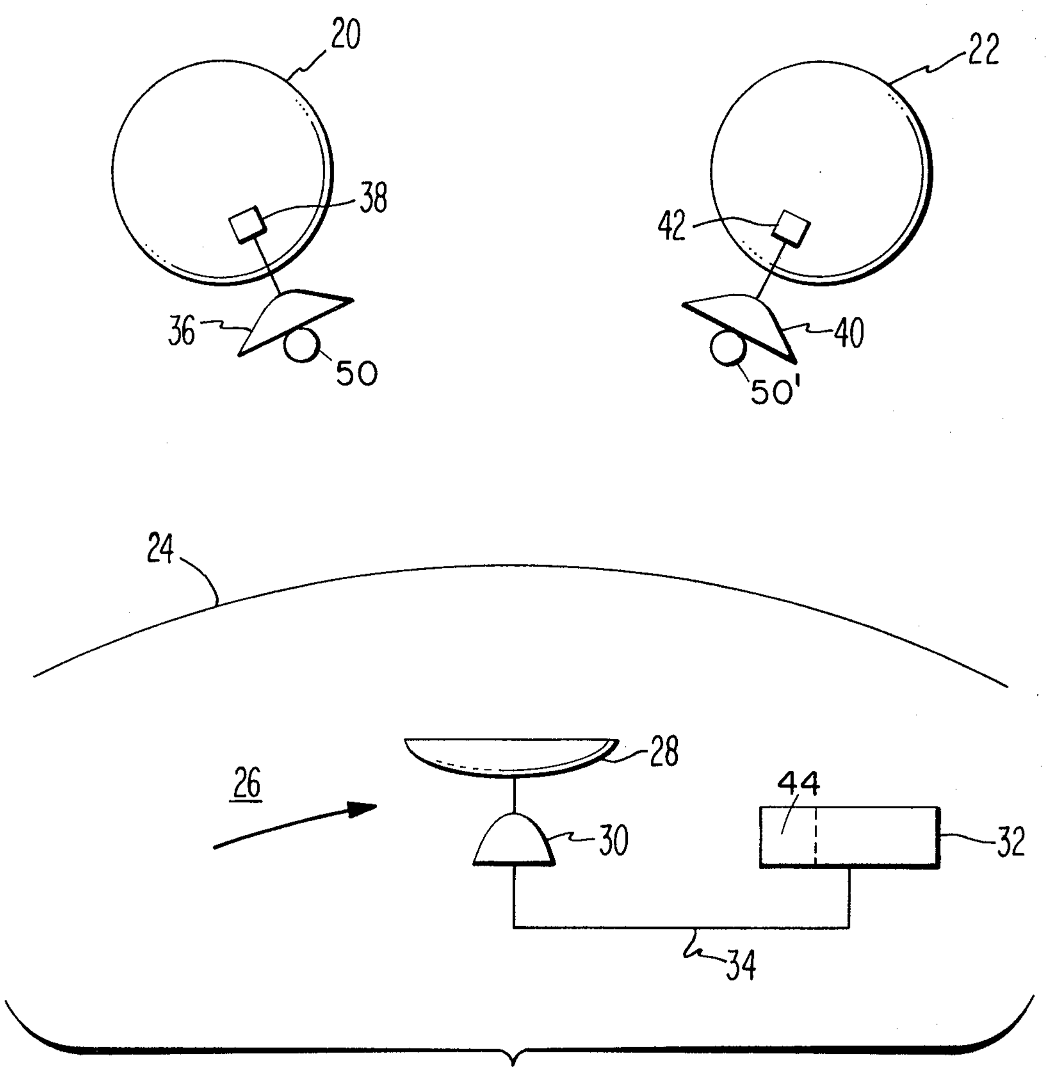

FIG. 9 is a schematic communication illustrating a system embodying the invention.

DETAILED DESCRIPTION OF THE PREFERRED EMBODIMENTS

Perturbations of Synchronous Orbits

Consider first the behavior of an earth satellite in a circular orbit at approximately synchronous altitude but not necessarily precisely in the plane of the equator of the earth. See FIG. 1. Like any other satellite, it is subject to the perturbing effects of the sun and moon and of the oblate earth. These perturbing effects manifest themselves in changes in the shape or orientation of the satellite orbit and also in changes in the position of the satellite along the orbit. The perturbations of importance here are those that affect the inclination of the orbit plane with respect to a reference plane fixed in inertial space and the direction of the intersection of these two planes. In terms of the so-called Kepler elements of the orbit the inclination and the right ascension of the ascending node are of importance.

A review of the fundamentals of astronomical systems of measurements and the definition of commonly-used terms is given in Chapter I of the book "Astronomy" by Russell, Dugan, and Stewart, vol. 1, published in 1945 by Ginn and Company. Similar explanation of the terms used in defining the Kepler elements are given in this same reference, pages 246–249. Reference may also be made to U.S. Naval Oceanographic Office publication H.O. No. 220 entitled "Navigation Dictionary," second edition, and published by the U.S. Government Printing Office in 1969. The perturbing effects to which reference has been made above cause gradual or secular, changes in the orbit.

An extended analysis of the perturbations of the orbits of the earth satellites has been described in a publication by the Rand Corporation, Santa Monica, California by R. H. Frick, entitled "Orbital Regression of Synchronous Satellites Due to the Combined Gravitational Effects of the Sun, the Moon, and the Oblate Earth." (Report R-454-NASA, August, 1967).

Figure 1:
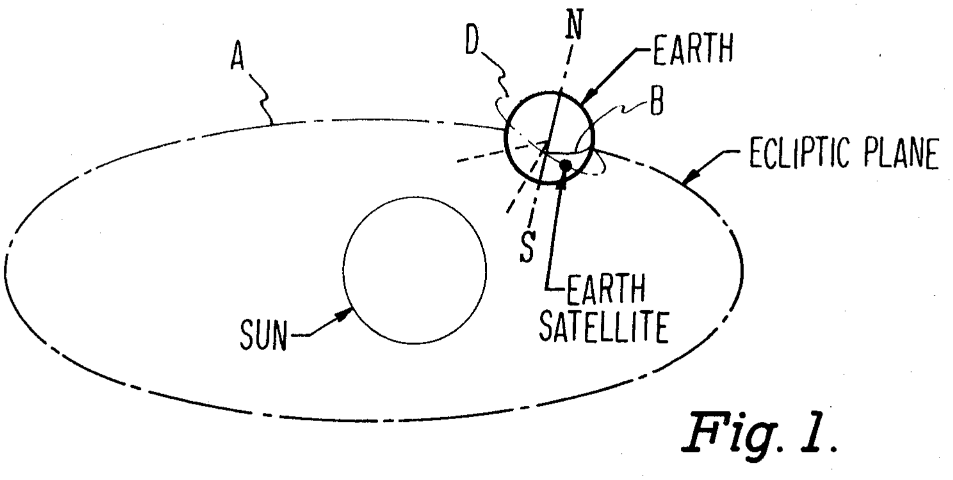
FIG. 1 is a diagram illustrating the geometry of the sun, the earth, and a satellite.

The planes defined by the several orbits of interest are illustrated in FIG. 1 herein. In FIG. 1 there is shown the plane of the earth's ecliptic A. The plane of the ecliptic is the great circle formed between the intersection of the plane of the earth's orbit about the sun with the celestial sphere. The plane of the equator of the earth is designated B, and the plane of the orbit of the satellite is designated D. The phenomena of the perturbations of the orbits are summarized in the Frick article as follows:

"The major effect of the perturbing influences considered is to produce motion of the orbital plane relative to inertial space. The nature of this motion can be completely described by the trace of the normal to the orbital plane [of the satellite] on a sphere concentric with the earth. . . . For an orbit of a given radius an orbital orientation can be found which remains invariant relative to inertial space. This invariant plane has a common intersection with the earth's equatorial plane and the plane of the ecliptic, while its inclination to the latter is always less than that of the equatorial plane. For low-altitude orbits, the invariant plane is very nearly equatorial, with an inclination of 23°27′ relative to the ecliptic. As the orbital altitude increases, the value of the inclination decreases to 16°7′ at synchronous altitude and approaches zero for extremely high orbits."

The "common intersection" referred to by Frick is the line of nodes of the satellite that lies in the direction of the vernal equinox, that is, the First Point of Aries or $O^h$ right ascension. This is shown in FIG. 2, to be described, as the dotted line PQ.

Figure 2:
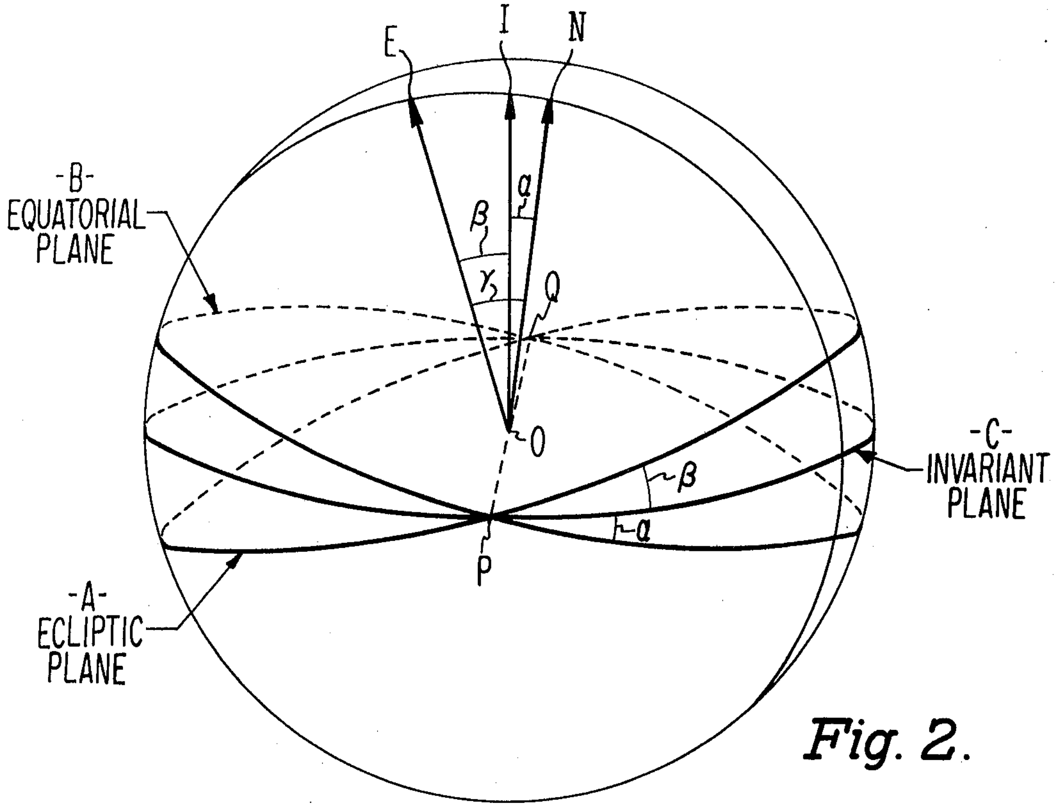
FIG. 2 is a diagram illustrating the several planes concerning the geo-synchronous orbit.

Referring now to FIG. 2 there are illustrated several planes defined by the orbits just discussed. The ecliptic plane, designated A, has a normal (perpendicular line) OE. The equatorial plane, as designated B, has a normal ON which is directed to and through the north pole of the earth. The invariant plane is designated C and has a normal OI. The three vectors OE, ON, and OI lie in the same plane, and this plane is perpendicular to the line of nodes PQ at the center of the earth O. According to the analysis of the phenomenon as described by Frick, the angle $\beta$ between the ecliptic and the invariant planes is 16°7′ at synchronous altitude, so that the angle $\alpha$ between the earth's axis and the normal to the invariant plane is 7°20′.

If a satellite is in a circular orbit whose plane D is not coincident with C, as shown in FIG. 3, the normal to the satellite orbit lies along OS. Then during an interval of a number of years the vector OS traces out a cone whose axis is OI and whose apex half-angle is $\theta$. The angle $\theta$ is constant except for small-amplitude periodic terms. The ascending node of the satellite orbit is at R when referred to the equatorial plane. The line of nodes thus moves in a retrograde direction along plane B. The period of the precessional motion of OS is about 53 years for orbits nearly equatorial. The actual period in years is $$T = 52.84 \sec \theta \qquad (1)$$

For an orbit that is equatorial at one time in its history, $T = 53.249$ years.

Secular Changes in the Satellite Orbit

Figure 4B:
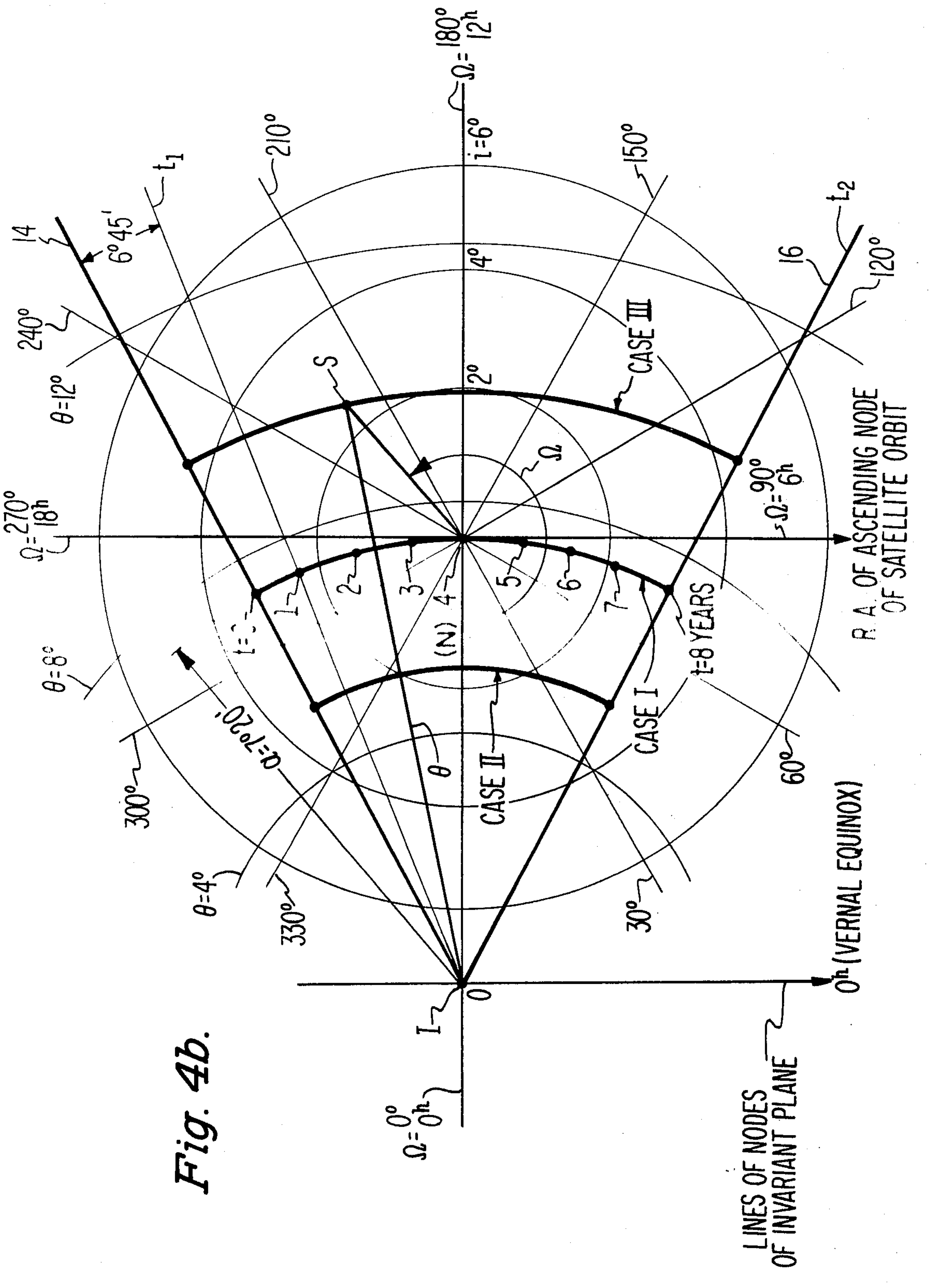

The description of these phenomena can be somewhat simplified by projecting the celestial sphere of FIG. 3 onto a plane tangent at I. In this type of projection, known as a gnomonic projection and as shown in FIGS. 4*a* and 4*b* the trace of point S is a circle with center I. The north pole of the earth is shown at N and is displaced 7°20′ from I. At any time t the polar coordinates of point S represent uniquely a satellite orbit of inclination i (referred to the equatorial plane and measured by the length NS) and of right ascension of the ascending node $\Omega$. Then point S moves clockwise in a circle with center at I and radius $\theta$ (where $\theta$ is measured by the length OS) with uniform speed and with period T. Epochs $t_1$ and $t_2$ in the period T are represented by radial lines (shown as reference lines 14 and 16 respectively) from I. The interval of one year corresponds to an angle of approximately 6°45′ at I.

With this protrayal of the behavior of the orbit of a quasi-equatorial synchronous satellite subject to the perturbations due to the sun, the moon, and the oblate earth, there will now be described the procedure according to the invention for selecting the orbit into which the satellite must be launched.

Figures 5A, 5B:
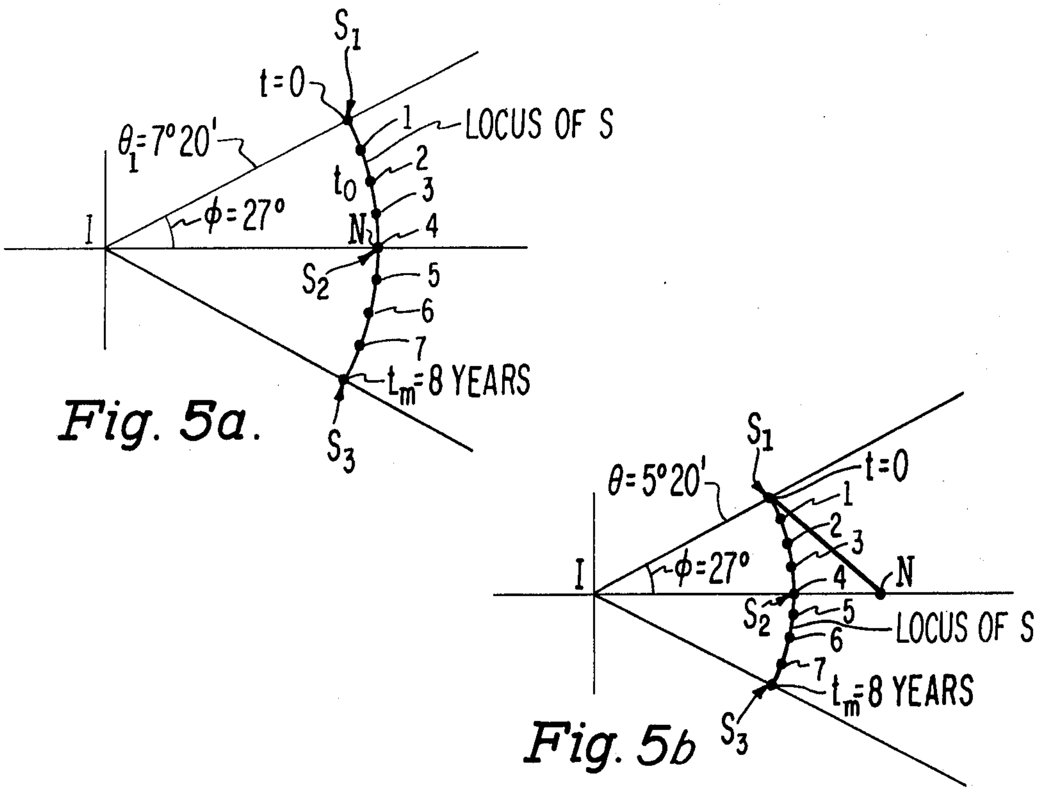
Figure 6A:
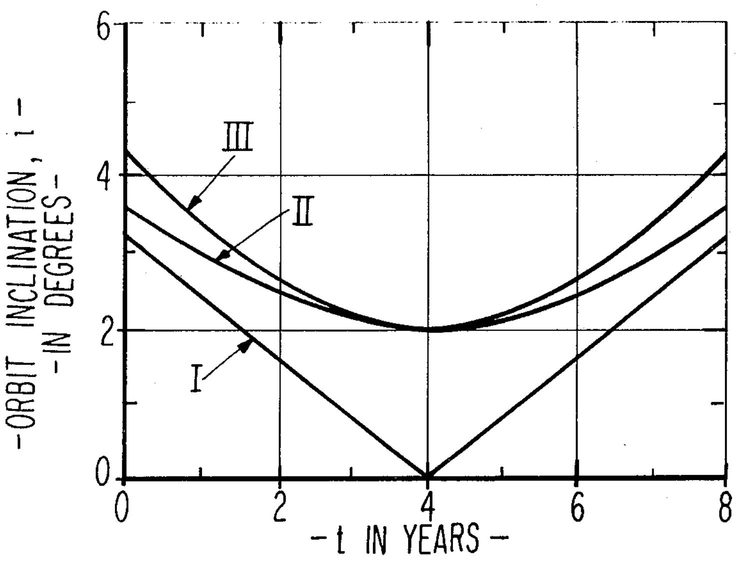
Figure 6B:
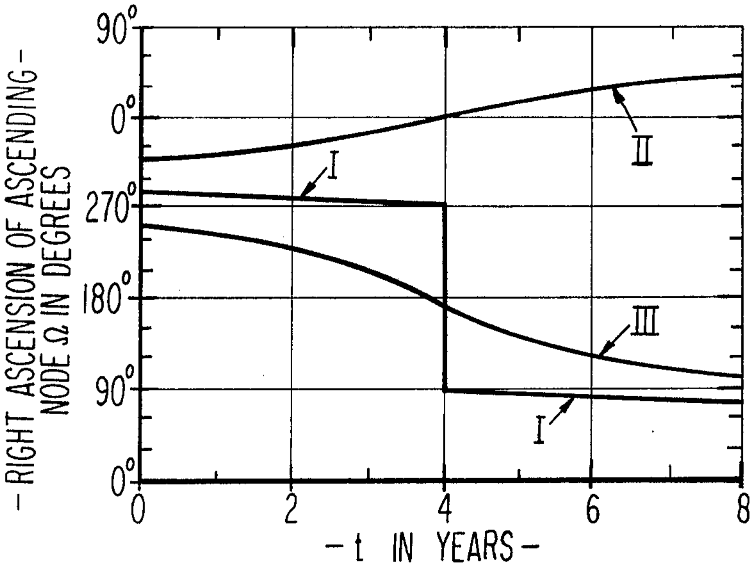

An example will illustrate the selection. Assume it is desired to establish a satellite in synchronous orbit and to limit the inclination to $i_{max}$ throughout a lifetime $t_m$ = 8 years. FIG. 5*a* shows the locus of S as a function of time. At $t = 4$ years, S lies at N, and the orbit is truly equatorial. The angle $\alpha$ shown in FIGS. 2 and 3 corresponds to the line segment IN of FIGS. 5*a* and 5*b*. The angle $S_1$ IN is designated $\phi$. At $t = 0$ $$i_{max} = \arc\cos(\cos^2\alpha + \sin^2\alpha \cos\phi) = \mathbf{3.1°} \qquad (2)$$

since $\alpha = 7.33°$ and $\phi = 27°$. During the 8-year life the inclination will vary as shown as Case I in FIG. 6*a*. The average rate of change is 0.78° per year. The right ascension of the ascending node $\Omega$ is plotted in FIG. 6*b*.

In another case, as shown in FIG. 5*b*, initial conditions can be chosen to diminish somewhat the change in magnitude of the inclination over the same lifetime. In this case point N lies outside the locus of S. The variations of i and $\Omega$ with time are shown as Case II of FIGS. 6*a* and *b*. Here the inclination changes only 0.38° per year. If the locus of S encloses point N, the typical values are shown as Case III of FIGS. 6*a* and *b*. For various embodiments of the invention it may be preferable to select different initial conditions within the classes of cases shown in the examples, as will become clearer in view of the discussion which follows.

In general, the preferred initial conditions include an orbit inclination of 7°20′ or less and a right ascension of the ascending node between 180° and 360°. In other words, the point S representing the satellite orbit normal should lie in the upper half of the plane of FIGS. 4*a* and 4*b* and within a circle of radius IN with center at N.

Elimination of Solar Transit Outages

In a communication satellite system employing highly directive receiving antennas at the earth stations, interruptions ("outages") in reception may occur when the antenna beam of a particular station is pointed toward the sun and the satellite simultaneously. This is because the sun is a strong source of thermal noise in the receiver RF band. When the communication satellite transits the solar image as seen at a receiving station, this type of outage occurs. If the earth station is at the equator and the satellite is in a synchronous equatorial orbit and at the same longitude as the earth station, the outages occur near noon for several days about the spring and autumn equinoxes (March 21 and September 21), with a maximum duration of about 8 minutes per day. For a receiving station at the latitude of the United States, parallax of the satellite causes the outage days to be earlier in late winter (e.g., late in February and early in March) and later in the autumn. When the earth station lies west or east of the satellite meridian, the outage will occur before or after noon, respectively.

If the satellite orbit is somewhat inclined, the days on which solar transit outages will occur will depend on the orientation of the orbit with respect to the ecliptic.

A more detailed description of the phenomenon as applied to a communication satellite system has been given by C. W. Lundgren in the Bell System Technical Journal, volume 49, October 1970, beginning on page 1943, in a paper entitled "A Satellite System for Avoiding Serial Sun-Transit Outages and Eclipses." In this article he proposes to use two or more satellites in inclined orbits and phased so as to eliminate simultaneous solar transit outages. The satellites are maintained in the selected orbits fixed in inertial space by the expenditure of fuel for north-south station keeping in the same manner as is now practiced by others for a true equatorial orbit. As will be seen presently, the present invention is an improvement over the system as described by Lundgren in that no feul expenditure is required to maintain equally desirable orbits.

The method of obtaining this improvement can be shown by an example wherein two or more satellites are in orbits whose orientations are specified by points in FIG. 5*a*. Let us assume three satellites in orbits of which one satellite orbit normal is at point $S_1$, the second is at $S_2$ and is coincident with N, and the third is at $S_3$. These might represent respectively, three satellites 1, 2, and 3, launched at 4-year intervals, satellite 3 being the oldest and 1 the youngest, each starting with the same orbit orientation. The trace of each orbit on the celestial sphere can be given by the declination and right ascension as shown in FIG. 7.

Before discussing the significance of the declination scales in FIG. 7, we shall consider the effect of parallax. Since an earth synchronous satellite is at a relatively small distance from the earth compared to the distance to the sun, the apparent position on the celestial sphere as seen by an observer on the earth's surface will in general be different from that seen by an observer at the center of the earth, the latter being the origin for the celestial coordinate system.

If reference is made to FIG. 8 there will be seen a satellite $S_1$, the earth with center O, and the sun at a very large distance from O. The axis of the earth lies in the plane of the diagram. The angle $\delta$ referred to the equatorial plane B, or line OE, is the true declination of the satellite. To an observer at J for whom the equatorial plane is represented by JE′, parallel to OE, the apparent declination of $S_1$ is angle $\delta_a$.

The declination of the sun $\delta'$ as observed at J is practically the same as observed at O because of the great distance between sun and earth. We can thus use the true declination of the sun as the value $\delta'$. For any time of year $\delta'$ is given in published ephemeris tables.

If we now revert to FIG. 7, we indicate by scale G the true declination of the satellites of this example and by scale H the apparent declination $\delta_a$ as seen by an observer at an earth station in the United States. The declination of the sun $\delta'$ is also referred to scale H to account for parallax of the staellite.

During each sidereal day satellite 1 follows the curve of $S_1$. At solar noon on the meridian on which it is stationed, it has the same right ascension as the sun. Thus a plot W of the coordinates of the sun on the same graph will show by the points of intersection with $S_1$ the occurrences of solar transits. For example where the earth station J is at about 41° N. Latitude, the parallax of −6.5° in declination is accommodated by the displaced declination scale H also given in FIG. 7. The sun's position (referred to Scale H) is given for a number of successive days before the vernal equinox.

The solar disk has a diameter for radio wavelengths approximately the same as its optical diameter of 0.5°. If the receiving antenna has a beam width (within which solar noise would be appreciable) of 1.5°, then if the apparent declinations of the satellite and the sun differ by less than 1°, an interruption, or outage, will occur near local noon. These periods are indicated for the three satellites in FIG. 7.

As seen from the earth station at J (FIG. 8), satellite 1 of the example transits the center of the solar disk at point U in FIG. 7. This occurs on March 12 at high noon if J is on the meridian of the satellite. The satellite will transit some portion of the solar disk each day during the period denoted by "solar transit interval" because $[\delta_a - \delta'] < 1°$ during this interval. Near noon on each day from March 10 through March 14 a communication outage will occur with satellite 1. The outage period for satellite 2 is March 2–6, while that for satellite 3 is February 20–25. It will be apparent that a similar plot can be made for the autumn period.

Assume satellites 1 and 2 are in orbit and one serves as a spare for the other. Satellite 1 operates as the working unit, carrying all the communication traffic until about March 8 without solar transit outages. Then during a nighttime lull in traffic, communication is shifted to satellite 2, whose period of noontime outages came to an end on March 7. At any time before the autumn critical period the roles of the two satellites can be reversed. Meanwhile and at all other times one satellite serves as the "back-up," or spare, for the other. The interval available for transition is increased if the two satellites are separated along their orbits.

Note that advantage is taken of the locations of the nodes of the satellites which in the case of satellites 1 and 3 are approximately 90° displaced from the equinox line and out of phase with each other. As a consequence the curves $S_1$, $S_2$, and $S_3$ of FIG. 7 are separated from each other by nearly the greatest possible amount, so that the three solar transit intervals do not overlap. This important property of the orbits we have selected is shown clearly in FIG. 6b.

Fuel Economies

In a certain spacecraft designed according to the heretofore state-of-the-art techniques for synchronous equatorial operation and for communication relaying the total mass at launch was approximately 1500 pounds. The satellite was intended to be launched from Cape Kennedy in Florida into a highly elliptical transfer orbit with apogee altitude of 22,300 statute miles. The apogee-kick motor was then fired near apogee to make the orbit circular and to reduce the inclination from an initial 28.5° value to zero. The mass of the spacecraft at the beginning of its operating life in orbit was chosen to be approximately 650 pounds, the difference being due primarily to the apogee-kick motor fuel expected to be expended. At the beginning of operating life in orbit a reserve of 130 pounds of hydrazine fuel in the spacecraft is needed for north-south station keeping over an 8-year design life.

In contrast, consider the fuel requirements for an orbit with an initial inclination of 4° according to the method of the present invention. The orbit normal is allowed to precess in the selected manner described above. Fuel savings are due to two factors:

1. The initial launch inclination is altered by 4° less than for an equatorial orbit, i.e., the initial launch inclination is changed by 24.5° instead of 28.5°. The computed saving in mass of apogee-motor fuel and structure is approximately 25 pounds.

2. The reserve fuel for north-south station keeping can be omitted at a saving of 130 pounds.

The total saving of 155 pounds permits an increase in spacecraft payload by nearly the same amount.

It will be appreciated that the elimination of fuel requirements for north-south station-keeping purposes allows either for increased payloads for a particular sized spacecraft, or a smaller sized spacecraft carrying the originally planned pay-load. It is believed that the method practiced according to this invention will reduce the cost of a satellite and will prolong its life in orbit.

Selection of Launch Conditions

A typical launch of a synchronous equatorial satellite from Cape Kennedy begins with injection into a low inclination elliptical transfer orbit near the first equator crossing (descending node). The apogee of the transfer orbit is at or near synchronous altitude (22,300 statute miles), and the orbit is circularized and its inclination reduced to zero at the first, second, or subsequent apogee passage (close to the ascending node), depending on the desired geographic station. The phasing orbit achieved by the apogee-kick motor is designed to have a period slightly more or less than one sidereal day according to whether the desired station longitude is west or east of the injection apogee longitude. After the requisite number of phasing orbits, during which the satellite drifts to its desired location, the orbit period is adjusted by the on-board propulsion to precisely one sidereal day. According to the present invention this sequence is modified only by the reduction of the inclination to a selected small value, but, it is to be noted, not zero.

For a specified station longitude in orbit the injection sequence described here leads to a fixed time interval $t_{0I}$ from take-off to injection into the final synchronous orbit over the desired station. By a suitable choice of launch time one can, in addition, achieve any desired right ascension of the ascending node. The right ascension of the node is of course chosen to provide a small variation in orbit inclination over the life of the satellite as described above under the section entitled "Secular Changes in the Satellite Orbit" i.e., in the range 180° to 360°.

The launch time to yield a specified right ascension of the ascending node $\Omega$ may be determined in the following manner. If injection into the synchronous orbit of inclination $i$ takes place at longitude $\lambda_I$ and latitude $\phi_I$ then the longitude of the ascending node of the orbits at the time of injection is $$\lambda_N = \lambda_I - \arcsin(\tan\phi_I/\tan i) \quad (3)$$

The right ascension of the ascending node is given by $$\Omega = \alpha_{GI} + \lambda_N \quad (4)$$

where $\alpha_{GI}$ is the Greenwich hour angle at the time of injection.

The right ascension of Greenwich at midnight on a specified date is given to sufficient accuracy for our purposes by $$\alpha_{GM} = (100.152 + 360\,(T-[T]) + 0.007694T) \bmod 360 \quad (5)$$

where $T = (\text{JD} - 2436935)/365.25$; JD = Julian date; and $[T]$ = integral part of T.

The time from midnight to injection is then given by $$t_{MI} = (\alpha_{GI} - \alpha_{GM})/\omega_E \quad (6)$$

where $\omega_E$ is the rate of rotation of the earth. Finally the launch time occurs a time $t_{0I}$ earlier than injection so that the launch must occur at time $$t_0 = t_{MI} - t_{0I} \quad (7)$$

past midnight on the day of launch.

Earth Station Antennas

Earth stations equipped with large highly directive antennas are currently provided with training means to track the satellite as the satellite departs in angle from its assigned station. The angles involved are generally small and represent minor departures from ideal orbits and may have periodic components as short as one sidereal day. Because the angles may considerably exceed the antenna beam width, however, automatic tracking is widely employed. This may be of the monopulse type similar to that used in fire-control radar systems. The earth station antennas commonly have provision for slewing, or repositioning, through angles of many degrees. Such automatic tracking antennas can be used unchanged in cooperation with satellites in the types of inclined orbits of the present invention.

Other alternatives may be preferred, particularly where costs are critical and where the antenna may be smaller. In one, the earth station antenna, which is provided with a two-axis mount, is controlled by a clock 44 consisting of one or more cams through motor drives on both axes so as to follow the desired diurnal motion of a few degrees in declination required by the inclined orbit. The amplitude of this periodic motion is varied slowly during the life of the satellite as shown in FIG.

6a. Such mechanical cam controls have as their counterpart a digital computer programmed to control stepping motors having digital input means. Thus, any suitable clocking means may be used to control the antenna movement.

Still another type of earth station antenna to operate in cooperation with the satellite described has a fan-shaped beam oriented so that the maximum beam dimension lies along the narrow figure-of-8 pattern traced out on the celestial sphere by the satellite in an inclined orbit, the major axis of which figure-of-8 pattern is along meridian 50 as shown in FIGS. 3 and 9. This beam dimension might by $8^\circ$ for the example described and might be adjustable to a smaller value for satellites in the middle period of their lifetime. The other dimension of the fan beam should be as narrow as possible, perhaps a small fraction of one degree. Such an antenna would not require training throughout the day to follow satellite motion. This antenna would be similar to that used on search radars and would have a long horizontal dimension and a much smaller vertical one. It would thus be more suitable mechanically in many earth station installations than a circular disk of comparable area.

Other earth station antennas suitable for use with the satellite system of this invention will be apparent. For example, the antennas described above may be suitably arranged in an electrically phased multi-element array to form the desired pattern or to steer it to follow the motion of the satellite.

A preferred system utilizing at least two satellites will now be described.

Communication System Utilizing At Least Two Satellites

Referring now to FIG. 9 two satellites 20 and 22 are shown in a geo-synchronous orbit with respect to the earth 24. A ground station 26 has a directable antenna 28 mounted on a control mechanism 30 under control of the ground station facility 32 over control conduit 34. Satellite 20 has an antenna 36 suitably mounted with directional control means 38 and, similarly, satellite 22 is provided with an antenna 40 and control means 42. According to the invention each of the satellites is so injected into an inclined orbit relative to the equatorial plane of the earth that at least one of the antennas 36 and 40 is in continuous communication with the ground station antenna 28 notwithstanding solar outages which otherwise interfere with the continuous operation of such a communication link. The respective satellites are controlled from the ground station 26 to transfer communication operations from one satellite to the other at selected times of the year as previously described herein.

The antennas 36 and 40 of each of the satellites may be provided with means for reorienting the antenna to compensate for changes in the angle of transmission owing to the change of position of the satellite relative to the ground station antenna that occurs because of the use of the inclined synchronous orbit of the invention. Each of satellites 20 and 22, it will be understood, will follow a figure-of-8 pattern about the figure's major axis 50 and 50', respectively, the axis 50' being along a meridian different from meridian 50 as shown in FIG. 3.

Another ground station, not shown, is provided with suitable antenna controls to transmit signals, such as television signals, to the ground station 26 by relaying the signals through the satellites 20 and 22. In such a system the ground station 26 is functioning as a receiving station. The satellites in cooperation with the receiver ground station 26 are provided with antenna control means for the ground station 26 to selectively receive the signal from one of the two satellites. In the event of a solar outage deleteriously affecting the received signal from the one satellite, the ground station 26 is arranged to transfer reception of the signal from the first selected satellite to the other satellite.

What is claimed is:

1. A satellite communication system comprising:

at least two satellites at substantially synchronous altitude above the earth and in progressively inclined orbits relative to the equatorial plane of the earth, each of said satellites having relay means, including an antenna, adapted for receiving signals from one earth station and retransmitting said signals to another earth station, each of said satellites having an orbit with a solar outage period that does not overlap the solar outage period of the other of said two satellites, the spacing between said two satellites being such that each satellite is respectively adapted to receive signals from and retransmit signals to any of said earth stations, each of said orbits being selected such that the inclination of each orbit is initially adjusted to a selected maximum inclination, whereby said orbit thereafter decreases towards zero inclination, and subsequently increases at least to said selected maximum inclination during a predetermined time period, said inclination of each satellite being initially $7^\circ 20'$ or less and being selected in accordance with said predetermined time period, and the right ascension of the ascending node ($\Omega$) being between $180^\circ$ and $360^\circ$ whereby, during said predetermined time period, the orbit inclination remains bounded for each of said satellites without the need of north-south station keeping means.

2. A system according to claim 1 including an earth station having a directive antenna for tracking at least one of said satellites.

3. A system according to claim 2 wherein the directive antenna is programmed to track said satellite according to a predetermined schedule.

4. A system according to claim 2 wherein said directed antenna is controlled by means in said ground station responsive to a signal received from said one satellite.

5. A system according to claim 3 wherein said schedule is programmed to direct the antenna to oscillate daily in sequentially decreasing and increasing amplitudes to track the progressively inclined orbit of said one satellite, said program being arranged to provide such oscillations for at least several years.

6. A system according to claim 5 wherein:

said program is effected by mechanical means.

7. A system according to claim 5 wherein:

said program is effected by electronic means.

8. A system according to claim 1 including:

a ground station having a fixed fan-beam antenna directed to the approximate orbit location of each of said satellites, said antenna being arranged to have a beam pattern which is relatively broad along the major axis of motion of the satellite and relatively narrow in the direction at right angles to said major axis whereby the beam pattern corresponds to the boundaries of the secular changes in the orbit of said satellite.

9. A system according to claim 1 including two earth stations, one of said stations serving as a signal transmission station, and the other of said stations serving as a receiving station of signals relayed from said satellites, means at said receiving station for selectively receiving signals from one of said satellites, and switching means for transferring the selection means to the other satellite to avoid solar outages.

10. A satellite communication system comprising:

at least one satellite at substantially synchronous altitude above the earth, each satellite in a progressively inclined orbit relative to the equatorial plane of the earth, an earth station having means for exchanging communication signals with said satellite, a steerable antenna at said earth station, and means for steering said antenna to track said satellite, said orbit being selected such that the inclination of the orbit is initially adjusted to a selected maximum inclination, whereby said orbit thereafter decreases towards zero inclination, and subsequently increases at least to said selected maximum inclination during a predetermined time period, said inclination being initially 7°20′ or less and being selected in accordance with said predetermined time period, and the right ascension of the ascending node (Ω) being between 180° and 360° whereby, during said predetermined time period, the orbit inclination remains bounded without the need of north-south station keeping means.

11. A system according to claim 10 wherein said antenna is steered by means responsive to a clock.

12. A system according to claim 10 wherein said antenna is steered by means responsive to an electronically controlled program.

13. A system according to claim 10 wherein said antenna is steered by means responsive to tracking signals received from said satellite.

14. A method of operating a communication satellite system comprising the steps of launching a satellite into an inclined progressively changing orbit such that Ω is selected to minimize the maximum inclination of the orbit throughout a predetermined time period defining the life of the satellite, wherein Ω is the right ascension of the ascending node, the value of Ω being such that the inclination of the orbit initially increases to a selected maximum inclination, thereafter decreases towards zero inclination, and subsequently increases to said selected maximum inclination, selecting the inclination of said satellite to be initially 7°20′ or less in accordance with said predetermined time period, selecting the right ascension of the ascending node (Ω) to be between 180° and 360° whereby, during said predetermined time period, the orbit inclination remains bounded without the need of north-south station keeping means, transmitting signals from a first earth station to said satellite, and relaying said signals from said satellite to a second earth station.

15. A method of operating a communication satellite system according to claim 14 comprising the steps of launching a second satellite into an inclined progressively changing orbit having its Ω substantially equal to the Ω of the first mentioned satellite, the orbit of said second satellite being selected so that the solar outage period of each of the first and second satellites do not overlap, and the spacing between said first and second satellites being such that each satellite is respectively adapted to receive and transmit signals with any of said two earth stations, transmitting said signals to said first mentioned and second satellites, inhibiting the reception of said signals from said first mentioned satellite to said second earth station and relaying said signals from said second satellite to said second earth station.

16. A method according to claim 14 wherein the life of said satellite is at least several years, including the steps of oscillating an antenna at each of said earth stations in sequentially decreasing and increasing amplitudes, and programming said oscillations for at least several years corresponding to the life of the satellite.

17. A satellite communication system comprising:

at least two satellites at substantially synchronous altitude above the earth and in progressively inclined orbits relative to the equatorial plane of the earth, each of said satellites having transmitting means, including an antenna, adapted for transmitting signals to at least two earth stations, each of said satellites having an orbit with a solar outage period that does not overlap the solar outage period of the other of said two satellites, the spacing between said two satellites being such that each satellite is respectively adapted to transmit signals to both of said earth stations, each of said orbits being selected such that the inclination of each orbit is initially adjusted to a selected maximum inclination whereby said orbit thereafter decreases towards zero inclination, and subsequently increases to said selected maximum inclination during a predetermined time period, said inclination of each satellite being initially 7°20′ or less and being selected in accordance with said predetermined time period, and the right ascension of the ascending node (Ω) being between 180° and 360° whereby, during said predetermined time period, the orbit inclination remains bounded for each of said satellites without the need of north-south station keeping means.

18. A system according to claim 17 including two earth stations, each of said stations serving as a signal receiving station of signals transmitted from said satellites, and means at each of said receiving stations for selectively receiving signals from one of said satellites.

* * * * *

UNITED STATES PATENT OFFICE
CERTIFICATE OF CORRECTION

Patent No. 3,836,969 Dated September 17, 1974

Inventor(s) D. S. Bond and J. M. L. Holman

It is certified that error appears in the above-identified patent and that said Letters Patent are hereby corrected as shown below:

Under Inventors [75] "Dold" should read --Donald--;
Under "References Cited" [56] should be the following:

| | | | |
|---|---|---|---|
| 3,028,488 | 4/62 | Hudspeth, et al. | 343/5R |
| 3,316,552 | 4/67 | Reid | 343/117R |
| 3,340,531 | 9/67 | Kefalas, et al. | 343/100ST |
| 3,349,403 | 10/67 | Kelley, et al. | 343/100STX |
| 3,448,450 | 6/69 | Alfandari, et al. | 343/100SA |
| 3,465,337 | 9/69 | Tanaka, et al. | 343/100SA |
| 3,482,245 | 12/69 | Paraquier | 343/100SA |
| 3,560,978 | 2/71 | Himmel, et al. | 343/100SAX |
| 3,568,197 | 3/71 | Cubley | 343/100ST |
| 3,643,075 | 2/72 | Hayes | 343/100SA |

Column 5, line 37, "feul" should read --fuel--;
Column 11, line 54, "increases" should read --is adjusted--;
In the drawing, Figure 4b, the lead line from "$t_1$" should be shown extending to radial line 14 rather than to the radial line extending adjacent to line 14.

Signed and sealed this 20th day of May 1975.

(SEAL)
Attest:

RUTH C. MASON
Attesting Officer

C. MARSHALL DANN
Commissioner of Patents
and Trademarks

FORM PO-1050 (10-69)
530 6|72
USCOMM-DC 60376-P69
U.S. GOVERNMENT PRINTING OFFICE : 1969 O—366-334